Jan. 20, 1942.  W. J. JACOBSSON  2,270,304
GAS REGULATION AND PRESSURE CONTROL APPARATUS
Filed Dec. 17, 1938
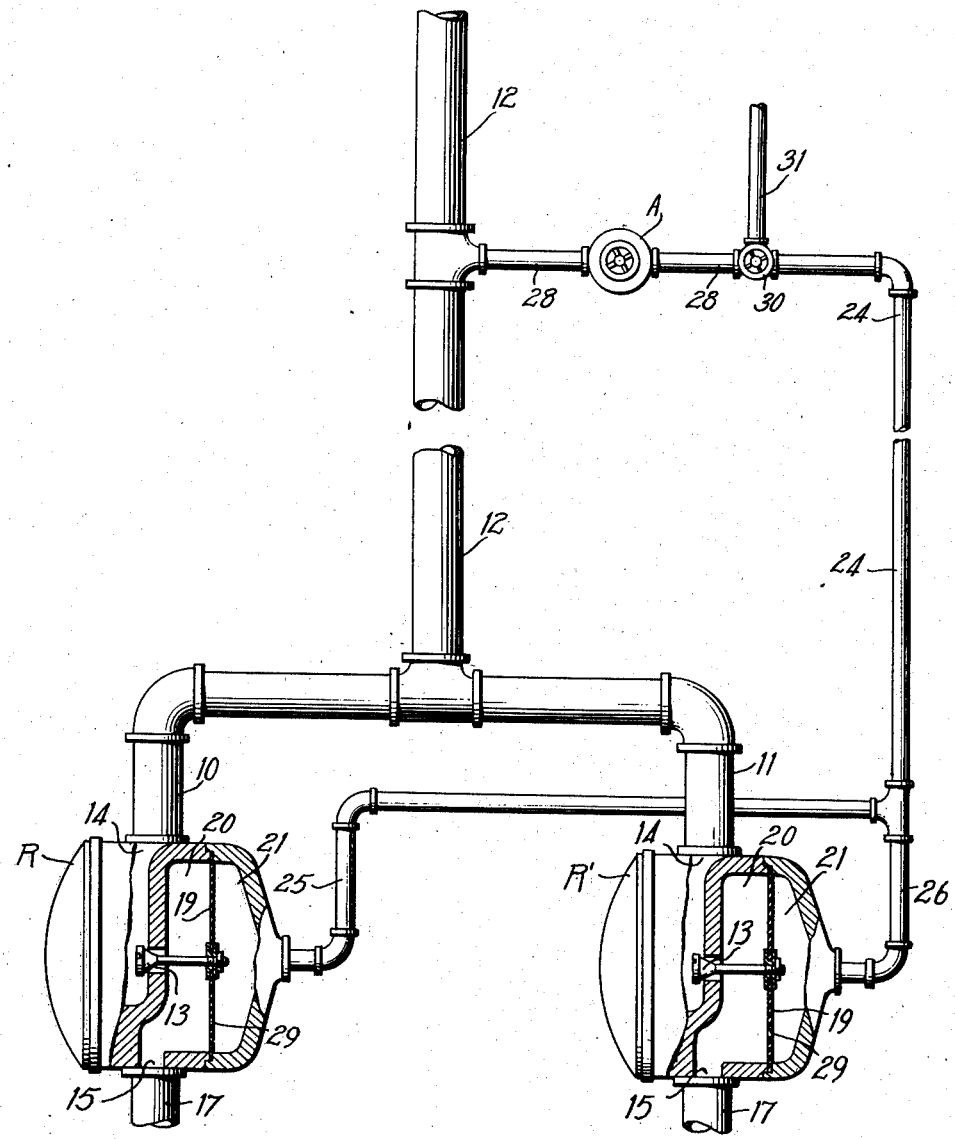
INVENTOR
WILGOT J. JACOBSSON
BY
ATTORNEY Patented Jan. 20, 1942

2,270,304

UNITED STATES PATENT OFFICE 2,270,304

GAS REGULATION AND PRESSURE CONTROL APPARATUS

Wilgot J. Jacobsson, Plainfield, N. J., assignor to Oxweld Acetylene Company, a corporation of West Virginia Application December 17, 1938, Serial No. 246,331

4 Claims. (Cl. 137—78)

This invention relates to gas regulation and pressure control, and more particularly to apparatus for supplying gas to a plurality of points of use, whereby the gas is supplied to each point of use at substantially the same and at a constant pressure.

In operations such as billet deseaming, as in U. S. Patent 2,125,174 in which a gang of blowpipes is utilized to remove a surface portion of predetermined depth from each of two or more sides of a billet or the like, it is necessary that the pressure of gas supplied to each blowpipe be substantially the same. This is particularly important in the case of the oxygen stream which removes metal from the surface of the billet by thermo-chemical action.

In supplying gas to a plurality of points of use or consumption, it has heretofore been the practice to regulate the flow to and pressure of gas at each point of use by separate diaphragm-controlled regulators. In certain of such diaphragm-controlled regulators, the pressure acting against one side of the diaphragm is opposed by the outlet pressure of gas acting against the opposite side of the diaphragm, and this diaphragm actuates a valve controlling the flow of gas through the regulator. Upon a decrease in the pressure of gas at the regulator outlet, the controlling pressure exerted against the diaphragm will cause the control valve to open, thereby causing an increased flow of gas through the regulator; and upon an increase in the regulator outlet pressure to slightly above the pressure for which the regulator is adjusted, the outlet pressure acting against the diaphragm will overcome the controlling pressure exerted on the diaphragm, thereby closing the control valve. In this manner, the outlet pressure of a regulator will be maintained substantially constant. It has been found that improved operation of a system of such diaphragm-controlled regulators is obtained when bleeder means is employed in the regulators to permit communication between the discharge or outlet chamber of each regulator and the pressure loading chamber of each regulator.

The principal objects of this invention are to provide apparatus including bleeder means for supplying gas to a plurality of points of use whereby the gas is delivered at substantially the same pressure and at a constant pressure to each point of use; to provide such apparatus wherein the gas is delivered to each point of use at substantially the same pressure and at a constant pressure irrespective of variations in the demand for gas at any point of use; to provide such apparatus whereby an accurate regulation of the gas pressure to each point of use may be obtained; to provide such apparatus which includes a plurality of diaphragm-controlled regulators, whereby operation of the regulators may be controlled by a single instrumentality; to provide such apparatus wherein such diaphragm-controlled regulators may also be utilized as valves for simultaneously shutting off the flow of gas to each point of use; and to provide such apparatus which will be simple in construction and effective in operation. Other objects and novel features will become apparent from the following description and the accompanying drawing, which is a diagrammatic plan of apparatus constructed in accordance with this invention.

In general, the apparatus of this invention comprises means for regulating simultaneously individually the flow of gas to and the pressure of gas at a plurality of points of use in accordance with the pressure of gas supplied thereto, such means including bleeder means, and such apparatus also comprising means controlling such regulation by opposing the pressure of regulating gas, at each point of regulation, by gas supplied at substantially the same pressure, preferably from a single instrumentality.

Referring to the drawing, one form of apparatus contemplated by this invention may comprise two or more diaphragm-controlled regulators, such as R and R', supplied with a gas, such as oxygen, by branch lines 10 and 11 leading from a main line 12. Each of the regulators R and R' is provided with a valve 13 for controlling the flow of gas from an inlet 14 to an outlet 15, a feed line 17 leading from each outlet 15 to a point of use. Each of the regulators R and R' is provided with a diaphragm 19, which controls the operation of control valve 13, and the regulators are so constructed that the outlet pressure of gas acts against one side of diaphragms 19 in chambers 20.

In accordance with this invention, the outlet pressure of gas in the discharge chamber 20 in each regulator is not opposed by the pressure of a spring as in regulators heretofore used, but is instead opposed by the pressure of gas in pressure loading a chamber 21 on the opposite side of diaphragm 19 from chamber 20. The opposing, or controlling gas, is supplied to chambers 21 from a control or auxiliary line 24 through branch lines 25 and 26, respectively connected with regulators R and R'. Gas at substantially a constant pressure is supplied to auxiliary line 24 by a pipe 28 connected with main line 12, the pressure of gas within the auxiliary line being controlled by a single instrumentality, such as an auxiliary regulator A installed in pipe 28. Since each of regulators R and R' is supplied with controlling gas from the same source and at the same pressure, the control and regulation of gas passing through lines 17 to the points of use will be identical.

The pressure of gas in auxiliary line 24 and chambers 21 is preferably slightly in excess of the desired outlet pressure in supply lines 17. To prevent a possible building up of pressure within auxiliary line 24 and chambers 21, which would cause the pressure of gas within supply lines 17 to increase, and for other reasons hereinafter explained, diaphragms 19 are provided with bleeder holes 29 which permit a slight flow of gas from chambers 21 to chambers 20 and thence to supply lines 17.

It can be seen that the auxiliary regulator A will not only cause the pressure in supply lines 17 to be the same, but also that a slight change in pressure in the supply lines can be easily effected by adjusting auxiliary regulator A. Furthermore, for any given setting of auxiliary regulator A, the pressure of gas supplied through lines 17 will remain constant, bleeder holes 29 permitting a slight but sufficient flow of gas through the auxiliary regulator to maintain the auxiliary regulator functioning in a proper manner.

In order that regulators R and R' may be used to shut off the flow of gas through supply lines 17 quickly and simultaneously, a two-way valve 30 is installed between auxiliary line 24 and pipe 28, this two-way valve selectively connecting, in one position, auxiliary regulator A and pipe 28 with auxiliary or control line 24, and in a second position, an exhaust pipe 31 with auxiliary line 24, the exhaust pipe 31 leading to the atmosphere. By turning two-way valve 30 to its second position, not only is it possible to release the pressure in chambers 21 suddenly, thereby causing valves 13 to close, but also to drain gas from chambers 20 through bleeder holes 29. While this drainage of gas through bleeder holes 29 will be relatively slow as compared to the flow of gas from chambers 21 when the two-way valve is turned to its second position, the drainage flow through the bleeder holes will be considerably more rapid than the flow therethrough in the opposite direction during normal operation, since during normal operation the difference between the pressure of gas in chambers 20 and 21 will be slight, but during drainage the pressure in chambers 21 will be substantially atmospheric and a much greater difference in pressure between chambers 20 and 21 will exist. In addition, as soon as valve 13 closes, a backflow of gas through lines 17 will be started, this backflow assisting in quickly shutting off the blowpipes or similar apparatus at each point of use.

As an example of one application of this invention, but not in any way in limitation of the scope thereof, in one installation oxygen was supplied by each of two regulators, such as R and R', to a gang of blowpipes operating on two opposite sides of a billet in deseaming apparatus, such as disclosed in U. S. Patent 2,125,174. In this particular installation, oxygen was supplied through lines 17 at a pressure which was around 45 lbs. per sq. in. gauge, the oxygen supplied through main line 12 being at a pressure of between 100 and 150 lbs. per sq. in. gauge. The auxiliary regulator A was adjusted so that the pressure in control line 24 was around 50 lbs. per sq. in. gauge, i. e. about 5 lbs. per sq. in. in excess of the pressure in supply lines 17. In this particular installation, the areas of diaphragms 19 were about 25 sq. in., and bleeder holes 29 were $\frac{1}{16}$ in. in diameter, thus having an area of about 0.00308 sq. in. In other words, the ratio of the area of diaphragms 19 to the area of bleeder holes 29 was approximately 8000 to 1, so that flow through the bleeder holes made no appreciable difference in the regulation of pressure and flow of gas through supply lines 17.

Although a specific embodiment of this invention has been described as being particularly applicable to deseaming apparatus, it will be understood that the principles of this invention may be utilized in supplying gas to a plurality of points of use or consumption in other instances. For example, a plurality of welding or heat treating blowpipes may be supplied with oxygen, with acetylene, or with other gases, and the welding or heat treating blowpipes may be operating simultaneously on the same piece of work, or on different workpieces. Furthermore, the control gas need not be supplied from the main supply line, but may be supplied from another source. It will be further understood that changes and modifications of the apparatus may be made which will not depart from the spirit and scope of this invention.

What is claimed is:

1. Apparatus for supplying and controlling the flow of gas to a plurality of points of use, comprising a main supply line; a plurality of branch lines leading from said main supply line to said points of use; a plurality of regulators for controlling the flow of gas through said branch lines, each of said regulators having an inlet and an outlet and a valve for controlling the flow of gas therethrough, and also a diaphragm for controlling the operation of such control valve, said diaphragm being provided with a bleeder hole having a relatively small area; an auxiliary line leading from said main supply line and having a branch line connected with each of said regulators, said regulators being constructed and so connected with said branch lines of said auxiliary line that the diaphragm of each regulator is subject on one side to the pressure of gas at the outlet of said regulator and subject on the opposite side to the pressure of gas in said auxiliary line; an auxiliary regulator for controlling the pressure of gas in said auxiliary line and for controlling the pressure exerted against such opposite sides of such diaphragms; a two-way valve in said auxiliary line between said auxiliary regulator and said branch lines of said auxiliary line; and an exhaust line connected to said two-way valve.

2. Apparatus for supplying and controlling the flow of gas to a plurality of points of consumption, comprising a main gas supply line; a branch supply line leading from said main supply line to each of said points of consumption; a regulator in each of such branch lines, each of such regulators having an inlet and an outlet and a valve controlling the flow of gas from said inlet to said outlet; an auxiliary gas line connected with a source of gas pressure and having a branch leading to each of said regulators; means controlling the gas pressure in said auxiliary line, each of said regulators being provided with a diaphragm for controlling the operation of the valve associated therewith and being so constructed and arranged that such diaphragm is subject on one side to the gas pressure at the regulator outlet and subject on the opposite side to the gas pressure in said auxiliary line; an exhaust line; and a two-way valve for selectively connecting said auxiliary line with said exhaust line or with the source of gas pressure to which said auxiliary line is connected; and each of said diaphragms being provided with a bleeder hole having a relatively small area to effect the drainage of gas from said points of consumption when said two-way valve connects said auxiliary line and said exhaust line for effecting the withdrawal of gas from said auxiliary line through said exhaust line.

3. Apparatus for supplying and controlling the flow of gas to a plurality of points of use, comprising a main gas supply line; a branch supply line leading from said main supply line to each of said points of use; a diaphragm-controlled regulator in each of such branch lines; an auxiliary gas line connected with a source of gas pressure and having a branch leading to each of such regulators; means controlling the gas pressure in said auxiliary line, each of said regulators being so constructed and arranged that the diaphragm thereof is subject on one side to the pressure of the gas discharging from such regulator and subject on the opposite side to the gas pressure in said auxiliary line; an exhaust line; valve means for selectively connecting said auxiliary line with said exhaust line or with the source of gas pressure to which said auxiliary line is connected; and each of said regulators having bleeder means to effect the drainage of gas from said points of use when said valve means connects said auxiliary line and said exhaust line for effecting withdrawal of gas from said auxiliary line through said exhaust line.

4. Apparatus for supplying and controlling the flow of gas to a plurality of points of use, comprising a main gas supply line; a plurality of branch lines leading from said main supply line to said points of use; a plurality of diaphragm-controlled regulators for controlling the flow of gas through said branch lines; an auxiliary gas line leading from said main supply line and having a branch line connected with each of said regulators, said regulators being so constructed and connected with the branch lines of said auxiliary line that the diaphragm of each regulator is subject on one side to the pressure of gas discharging from such regulator and subject on the opposite side to the gas pressure in said auxiliary line; bleeder means in each of said regulators for effecting communication between the discharge chamber of each regulator and the branch line of said auxiliary line which is connected to such regulator; an auxiliary regulator for controlling the gas pressure in said auxiliary line and for controlling the pressure exerted against such opposite sides of such diaphragms; valve means in said auxiliary line between said auxiliary regulator and the branch lines of said auxiliary line; and an exhaust line connected to said valve means, the latter being so constructed and arranged that said auxiliary line may be selectively connected with said main supply line or with said exhaust line.

WILGOT J. JACOBSSON.